United States Patent
Chono

(10) Patent No.: US 9,426,485 B2
(45) Date of Patent: Aug. 23, 2016

(54) VIDEO ENCODING DEVICE, VIDEO DECODING DEVICE, VIDEO ENCODING METHOD, VIDEO DECODING METHOD, AND PROGRAM

(71) Applicant: NEC Corporation, Tokyo (JP)

(72) Inventor: Keiichi Chono, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/759,469

(22) PCT Filed: Dec. 11, 2013

(86) PCT No.: PCT/JP2013/007276
§ 371 (c)(1),
(2) Date: Jul. 7, 2015

(87) PCT Pub. No.: WO2014/106878
PCT Pub. Date: Jul. 10, 2014

(65) Prior Publication Data
US 2015/0358632 A1  Dec. 10, 2015

(30) Foreign Application Priority Data
Jan. 7, 2013  (JP) .................. 2013-000290

(51) Int. Cl.
*G06K 9/36* (2006.01)
*H04N 19/44* (2014.01)
(Continued)

(52) U.S. Cl.
CPC ............ *H04N 19/44* (2014.11); *H04N 19/107* (2014.11); *H04N 19/146* (2014.11); *H04N 19/176* (2014.11); *H04N 19/70* (2014.11); *H04N 19/91* (2014.11); *H04N 19/96* (2014.11)

(58) Field of Classification Search
USPC ............ 382/233, 232, 248, 250; 341/51, 56; 370/208, 328, 474, 491; 375/240.02, 375/240.23, 240.25, 240.26
See application file for complete search history.

(56) References Cited

U.S. PATENT DOCUMENTS 7,813,380 B2 * 10/2010 Oh ............... G10L 19/0017
341/51
8,199,827 B2 * 6/2012 Oh ............... H04H 20/65
375/240.25

(Continued)

FOREIGN PATENT DOCUMENTS

JP  2008-22383  1/2008
JP  2010-193401  9/2010
WO  WO 2011/053050 A2  5/2011

OTHER PUBLICATIONS

K. Chono et al., "On num_subsequenct_pcm specification", Joint Collaborative Team on Video Coding (JCT-VC) of ITU-T SG 16 WP 3 and ISO/IEC JTC 1/SC 29/WG 11, JCTVC-K0351, 11th Meeting, pp. 1-6, Oct. 2012.

(Continued)

*Primary Examiner* — Anh Do
(74) *Attorney, Agent, or Firm* — Finnegan, Henderson, Farabow, Garrett & Dunner LLP

(57) ABSTRACT

Although a video encoding device multiplexes ctu_pcm_flag syntax indicating whether all image blocks belonging to a coding tree unit as a set of image blocks are PCM blocks, at the top of the coding tree unit, when all image blocks belonging to the coding tree unit are PCM blocks, at least cu_split_flag syntax indicative of the splitting pattern of the coding tree unit is not multiplexed to transmit PCM data efficiently.

3 Claims, 12 Drawing Sheets

(51) Int. Cl.
*H04N 19/91* (2014.01)
*H04N 19/176* (2014.01)
*H04N 19/70* (2014.01)
*H04N 19/96* (2014.01)
*H04N 19/107* (2014.01)
*H04N 19/146* (2014.01)

(56) References Cited

U.S. PATENT DOCUMENTS

| | | | |
|---|---|---|---|
| 8,203,930 B2* | 6/2012 | Oh | G10L 19/0017 370/208 |
| 8,755,442 B2* | 6/2014 | Oh | G10L 19/0017 375/240.23 |
| 2008/0012738 A1 | 1/2008 | Seki et al. | |
| 2011/0103701 A1 | 5/2011 | Cheon | |

OTHER PUBLICATIONS

B. Bross et al., "High Efficiency Video Coding (HEVC) text specification draft 9", Joint Collaborative Team on Video Coding (JCT-VC) of ITU-T SG16 WP3 and ISO/IEC JTC1/SC29/WG11, JCTVC-K1003_v10, 11th Meeting, pp. i-281, Oct. 2012.

M. Coban et al., "1_PCM Signalling", Joint Collaborative Team on Video Coding(JCT-VC) of ITU-T SG 16 WP 3 and ISO/IEC JTC 1/SC 29/WG 11, JCTVC-K0258, 11th Meeting, pp. 1-7, Oct. 2012.

K. Chono, "AHG9: On Tickets 637, 763, and 777", Joint Collaborative Team on Video Coding (JCT-VC) OF ITU-T SG 16 WP 3 and ISO/IEC JTC 1/SC 29/WG 11, JCTVC-K0213-r3, 11th Meeting, pp. 1-4, Oct. 2012.

International Search Report and Written Opinion of ISA mailed Mar. 18, 2014.

* cited by examiner

FIG. 2
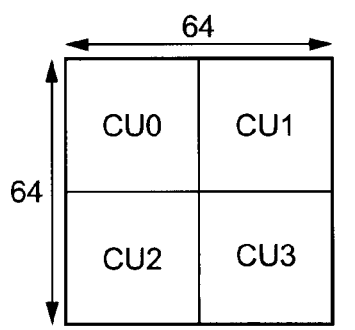 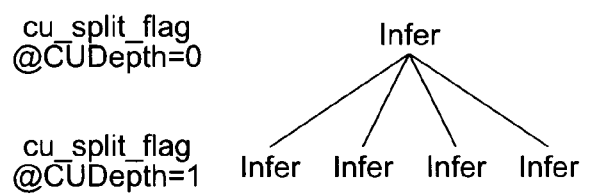
(A) COMPLETE CTU
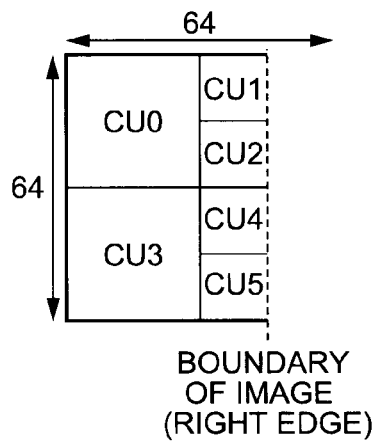 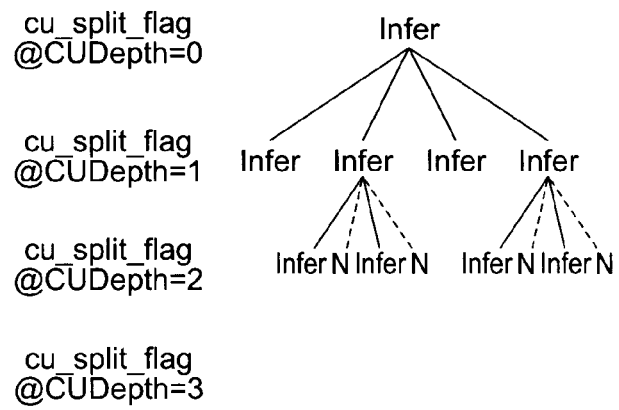
(B) INCOMPLETE CTU

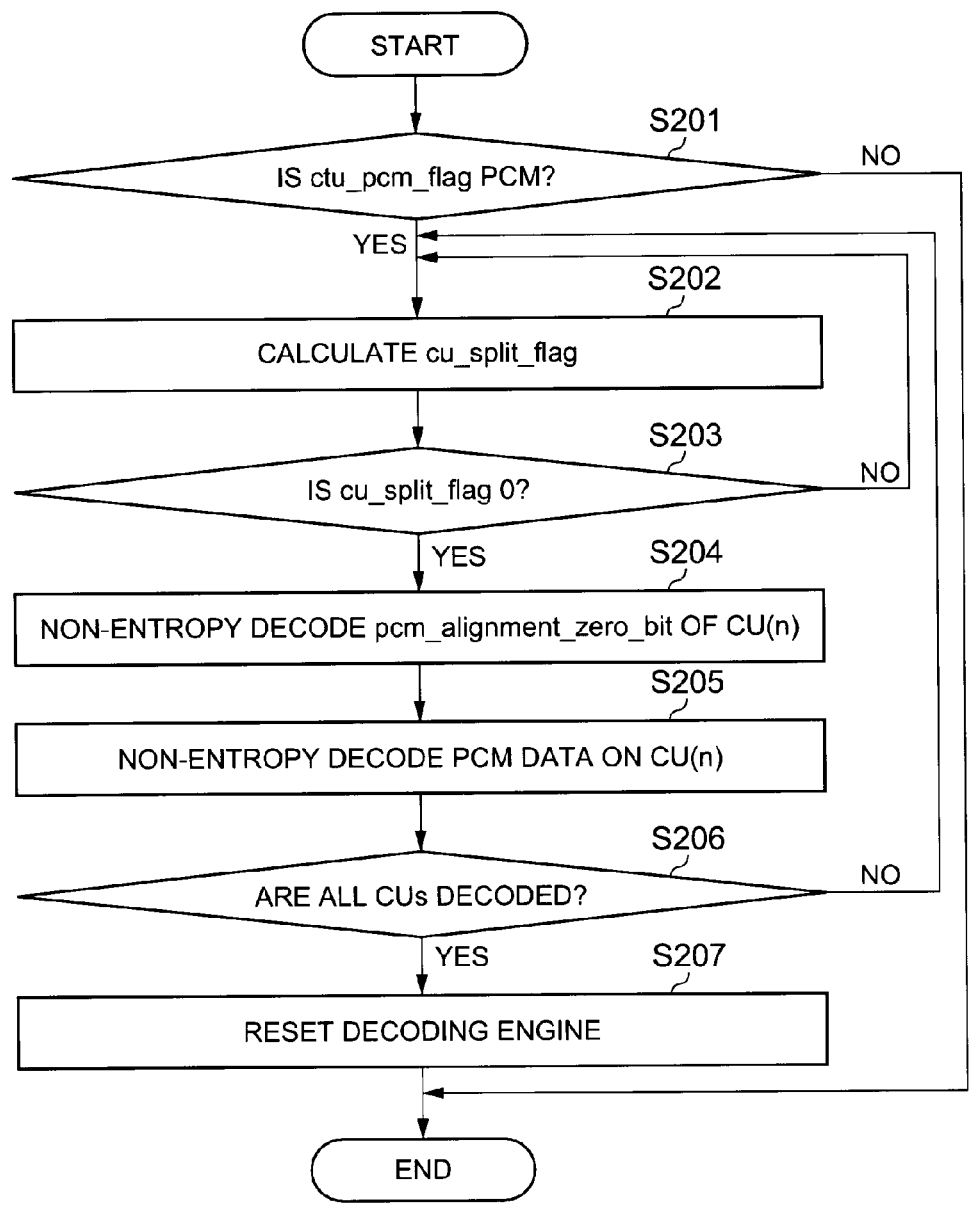

FIG. 6

(Coding tree unit syntax)

| coding_tree_unit() { | Descriptor |
|---|---|
| xCtb=( CtbAddrRS % PicWidthInCtbsY ) << Log2CtbSizeY | |
| yCtb=( CtbAddrRS / PicWidthInCtbsY ) << Log2CtbSizeY | |
| CtbAddrInSliceSeg = CtbAddrInRS - slice_segment_address | |
| if( slice_sao_luma_flag \|\| slice_sao_chroma_flag ) | |
| sao( xCtb >> Log2CtbSizeY, yCtb >> Log2CtSizeY ) | |
| if( ctu_pcm_enabled_flag ) | |
| ctu_pcm_flag | ae(v) |
| if( !ctu_pcm_flag ) | |
| coding_quadtree( xCtb, yCtb, Log2CtbSizeY, 0 ) | |
| else | |
| pcm_quadtree( xCtb, yCtb, Log2CtbSizeY, 0 ) | |
| } | |

FIG. 7

(PCM quadtree syntax)

| pcm_quadtree( x0, y0, log2CbSize, ctDepth ) { | Descriptor |
|---|---|
| if( x0 + ( 1 << log2CbSize ) > pic_width_in_luma_samples \|\|<br>    y0 + ( 1 << log2CbSize ) > pic_height_in_luma_samples \|\|<br>    log2CbSize > Log2MaxIpcmCbSizeY ) | |
|     cu_split_flag[ x0 ][ y0 ] = 1 | |
| else | |
|     cu_split_flag[ x0 ][ y0 ] = 0 | |
| if( cu_split_flag[ x0 ][ y0 ] ) { | |
|     x1 = x0 + ( ( 1 << log2CbSize ) >> 1 ) | |
|     y1 = y0 + ( ( 1 << log2CbSize ) >> 1 ) | |
|     pcm_quadtree( x0, y0, log2CbSize - 1, ctDepth + 1 ) | |
|     if( x1 < pic_width_in_luma_samples ) | |
|         pcm_quadtree( x1, y0, log2CbSize - 1, ctDepth + 1 ) | |
|     if( y1 < pic_height_in_luma_samples ) | |
|         pcm_quadtree( x0, y1, log2CbSize - 1, ctDepth + 1 ) | |
|     if( x1 < pic_width_in_luma_samples &&<br>        y1 < pic_height_in_luma_samples ) | |
|         pcm_quadtree( x1, y1, log2CbSize - 1, ctDepth + 1 ) | |
| } else | |
|     pcm_sample( x0, y0, log2CbSize ) | |
| } | |

FIG. 8

(PCM sample syntax)

| pcm_sample( x0, y0, log2CbSize ) { | Descriptor |
|---|---|
|     while( !byte_aligned() ) | |
|         pcm_alignment_zero_bit | f(1) |
|     for( i =0; i < 1 << ( log2CbSize << 1); i++ ) | |
|         pcm_sample_luma[i] | u(v) |
|     for( i =0; i < ( 1 << ( log2CbSize << 1) ) >> 1; i++ ) | |
|         pcm_sample_chroma[i] | u(v) |
| } | |

FIG. 13
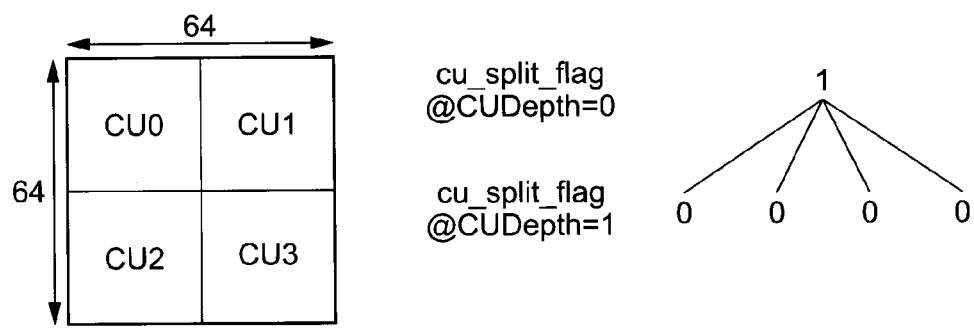
(A) COMPLETE CTU
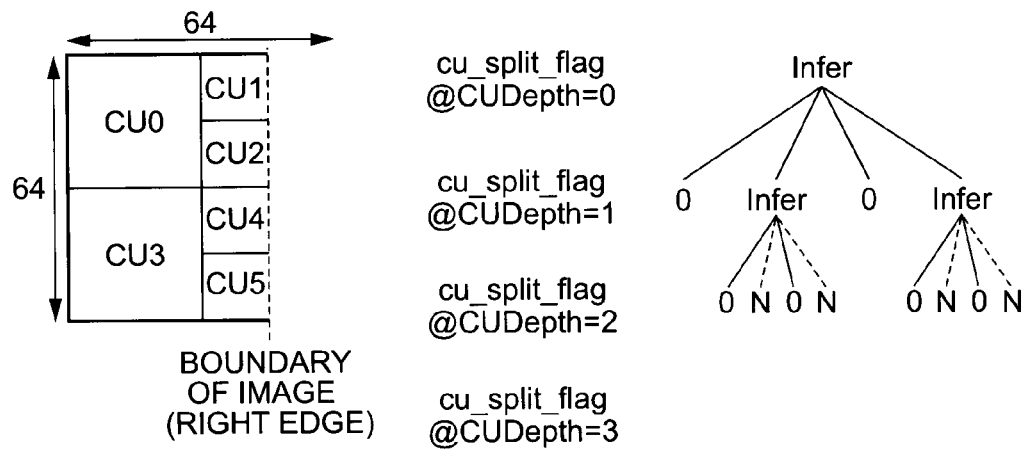
(B) INCOMPLETE CTU

VIDEO ENCODING DEVICE, VIDEO DECODING DEVICE, VIDEO ENCODING METHOD, VIDEO DECODING METHOD, AND PROGRAM

CROSS-REFERENCE TO RELATED PATENT APPLICATIONS

This application is a National Stage Entry of International Application No. PCT/JP2013/007276, filed Dec. 11, 2013, which claims priority from Japanese Patent Application No. 2013-000290, filed Jan. 7, 2013. The entire contents of the above-referenced applications are expressly incorporated herein by reference.

TECHNICAL FIELD

The present invention relates to a video encoding device and a video decoding device for automatically splitting a coding tree unit.

BACKGROUND ART

A video coding system based on a system described in Non Patent Literature (NPL) 1 divides each frame of digitized video into coding tree units (CTUs), and each CTU is encoded in raster scan order. Each CTU is split into coding units (CUs) in a quadtree structure and encoded. Each CU is split into prediction units (PUs) and predicted. Further, a prediction error of each CU is split into transform units (TUs) in a quadtree structure and transformed.

The CU is a coding unit of intra prediction/inter-frame prediction. Intra prediction and inter-frame prediction will be described below.

Intra prediction is prediction from a reconstructed image of a frame to be encoded. In the system described in NPL 1, a reconstructed pixel around a block to be encoded is extrapolated to generate an intra prediction signal. Hereinafter, a CU using intra prediction is referred to as an intra CU. Note that the value of pred_mode_flag syntax of the intra CU is 1 in NPL 1.

Further, an intra CU that does not use intra prediction is referred to as an I_PCM (Intra Pulse Code Modulation) CU. In the I_PCM CU, an image of the CU is transmitted intact instead of transmitting a prediction error of the CU. Note that the value of pcm_flag syntax of the I_PCM CU is 1 in NPL 1.

Inter-frame prediction is prediction based on an image of a reconstructed frame (reference picture) different in display time from a frame to be encoded. Hereinafter, inter-frame prediction is also referred to as inter prediction. FIG. 10 is an explanatory diagram depicting an example of inter-frame prediction. A motion vector $MV=(mv_x, mv_y)$ indicates the amount of translation of a reconstructed image block of a reference picture relative to a block to be encoded. In inter prediction, an inter prediction signal is generated based on a reconstructed image block of a reference picture (using pixel interpolation if necessary). Hereinafter, a CU using inter prediction is referred to as an inter CU. Note that the value of pred_mode_flag syntax of the inter CU is 0 in NPL 1.

An inter CU using inter-frame prediction not to transmit motion vector difference information and a CU prediction error is referred to as a Skip CU. In NPL 1, the value of skip_flag syntax of the Skip CU is 1.

A frame encoded with only intra CUs mentioned above is called an I frame (or an I picture). A frame encoded including inter CUs as well as intra CUs is called a P frame (or a P picture). A frame encoded including inter CUs for which not only one reference picture but two reference pictures are simultaneously used for inter prediction of a block is called a B frame (or a B picture).

Intra prediction and inter-frame prediction are as described above.

Referring to FIG. 11, the configuration and operation of a typical video encoding device that receives each CU of each frame of digitized video as an input image and outputs a bitstream will be described.

The video coding device depicted in FIG. 11 includes a transformer/quantizer 102, an entropy encoder 103, an inverse transformer/inverse quantizer 104, a buffer 105, a predictor 106, a PCM encoder 107, a PCM decoder 108, a multiplexed data selector 109, a multiplexer 110, a switch 121, and a switch 122.

As depicted in FIG. 12, a frame is made up of LCUs (Largest Coding Units). An LCU is made up of CUs (Coding Units). FIG. 12 is an explanatory diagram depicting an example of CTU splitting of a frame t and an example of CU splitting of CTU8 in the frame t when the spatial resolution of the frame is CIF (Common Intermediate Format) and the CTU size is 64. A quadtree structure of CTU8 can be represented by cu_split_flag=1 at CUDepth=0 indicating that a 64×64 region is split, three cu_split_flag=0 at CUDepth=1 indicating that first three 32×32 CUs (CU0, CU1, and CU2) are not split, cu_split_flag=1 at CUDepth=1 indicating that the last 32×32 CU is split, three cu_split_flag=0 at CUDepth=2 indicating that first three 16×16 CUs (CU3, CU4, and CU5) are not split, cu_split_flag=1 at CUDepth=2 indicating that the last 16×16 CU is split, and four cu_split_flag=0 at CUDepth=3 indicating that all 8×8 CUs (CU6, CU7, CU8, and CU9) are not split.

The video encoding device depicted in FIG. 11 encodes LCUs in raster scan order, and encodes CUs constituting each LCU in z-scan order. The size of a CU is any one of 64×64, 32×32, 16×16, and 8×8. The smallest CU is referred to as a smallest coding unit (SCU).

The transformer/quantizer 102 frequency-transforms an image (prediction error image) from which a prediction signal is subtracted to obtain a frequency transform coefficient of a prediction error image.

The transformer/quantizer 102 further quantizes the frequency transform coefficient with a predetermined quantization step size Qs. Hereinafter, the quantized frequency transform coefficient is referred to as a coefficient quantization value or a quantization level value.

The entropy encoder 103 entropy-encodes a prediction parameter and the quantization level value. The prediction parameter is information related to information on the prediction type (intra prediction or inter prediction) of a CU mentioned above and PUs (Prediction Units) included in the CU.

The inverse transformer/inverse quantizer 104 inverse-quantizes the quantization level value with the quantization step size Qs. The inverse transformer/inverse quantizer 104 further inverse-frequency-transforms the frequency transform coefficient obtained by the inverse quantization. The prediction signal is added to a reconstructed prediction error image obtained by the inverse transform, and the reconstructed prediction error image is supplied to the switch 122.

The multiplexed data selector 109 monitors the amount of input data of the entropy encoder 103 corresponding to a CU to be encoded. When the entropy encoder 103 can entropy-encode the input data within the processing time of the CU, the multiplexed data selector 109 selects output data of the entropy encoder 103, and supplies the output data to the multiplexer 110 through the switch 121. The multiplexed data selector 109 further selects output data of the inverse transformer/inverse quantizer 104, and supplies the output data to the buffer 105 through the switch 122.

When the entropy encoder 103 cannot entropy-encode the input data within the processing time of the CU, the multiplexed data selector 109 selects output data of the PCM encoder 107, and supplies the output data to the multiplexer 110 through the switch 121. The multiplexed data selector 109 further selects output data obtained by the PCM decoder 108 that PCM-decodes the output data of the PCM encoder 107, and supplies the output data to the buffer 105 through the switch 122.

The buffer 105 stores a reconstructed image supplied through the switch 122. A reconstructed image for one frame is referred to as a reconstructed picture.

The multiplexer 110 multiplexes output data of the entropy encoder 103 and the PCM encoder 107, and outputs the multiplexed output data.

Based on the above-mentioned operation, the multiplexer 110 in the video encoding device generates a bitstream.

CITATION LIST

Non Patent Literature

NPL 1: Benjamin Bross, Woo-Jin Han, Jens-Rainer Ohm, Gary J. Sullivan, and Thomas Wiegand, "High Efficiency Video Coding (HEVC) text specification draft 9," JCTVC-K1003 v10, Joint Collaborative Team on Video Coding (JCT-VC) of ITU-T SG16 WP3 and ISO/IEC JTC1/SC29/WG11 6th Meeting: Shanghai, CN, 10-19 Oct. 2012.

SUMMARY OF INVENTION

Technical Problem

In the video encoding device depicted in FIG. 11, the block header of a CU is entropy-encoded. In other words, when the block header (I_PCM mode header) of an I_PCM CU is to be transmitted, two processes are required, i.e., a process of outputting non-output symbols of an encoding engine of the entropy encoder 103 (after pcm_flag is entropy-encoded), and a process of resetting the encoding engine. As apparent from the section 7.3.9.4 Coding quadtree syntax and the section 7.3.9.5 Coding unit syntax in NPL 1, the I_PCM mode header is generally made up of CU split information (cu_split_flag syntax), the CU prediction type (skip_flag syntax, pred_mode_flag syntax, and pred_mode syntax, part_mode syntax), and a PCM flag (pcm_flag syntax) for a PU.

Referring to FIG. 13, encoding of I_PCM CUs successive in encoding order in a CUT will be described. As depicted in (A) of FIG. 13, it is assumed that, in a CUT to be encoded, CUs (CU(0), CU(1), CU(2), and CU(3)) of 0, 1, 2, and 3 successive in encoding order in the CTU are I_PCM CUs. A corresponding CTU bitstream is made up by interleaving a video bitstream of the I_PCM mode header of each CU, alignment data (pcm_alignment_zero_bit), and PCM data (pcm_sample_luma/pcm_sample_chroma). In other words, the CTU bitstream depicted in (A) of FIG. 13 is made up of: cu_split_flag=1, cu_split_flag=0, skip_flag=0, pred_mode_flag=1, part_mode=2N×2N, pcm_flag=1, pcm_alignment_zero_bit, and pcm_sample_luma/pcm_sample_chroma of CU(0); cu_split_flag=0, skip_flag=0, pred_mode_flag=1, part_mode=2N×2N, pcm_flag=1, pcm_alignment_zero_bit, and pcm_sample_luma/pcm_sample_chroma of CU(1); cu_split_flag=0, skip_flag=0, pred_mode_flag=1, part_mode=2N×2N, pcm_flag=1, pcm_alignment_zero_bit, and pcm_sample_luma/pcm_sample_chroma of CU(2); and cu_split_flag=0, skip_flag=0, pred_mode_flag=1, part_mode=2N×2N, pcm_flag=1, pcm_alignment_zero_bit, and pcm_sample_luma/pcm_sample_chroma of CU(3). As apparent from the section 7.3.9.5 Coding unit syntax and the section 7.3.9.7 PCM sample syntax in NPL 1, pcm_alignment_zero_bit, pcm_sample_luma, and pcm_sample_chroma are syntaxes to be non-entropy encoded.

Since the I_PCM mode header of each of CU(0), CU(1), CU(2), and CU(3) of I_PCM successive in encoding order in the CTU is entropy-encoded, the process of outputting non-output symbols of the encoding engine and the process of resetting the encoding engine mentioned above are repeated. Therefore, even though CU(0), CU(1), CU(2), and CU(3) are I_PCM successive in encoding order in the CTU, the CUs have to wait until the completion of the process of outputting non-output symbols of encoding engine and the process of resetting the encoding engine mentioned above executed on each of the I_PCM mode headers before PCM data on each CU are multiplexed. In typical technology, there is a problem that PCM data on I_PCM CUs successive in encoding order in the CTU cannot be multiplexed into a bitstream efficiently, i.e., that PCM data on I_PCM CUs successive in encoding order in the CTU cannot be transmitted efficiently.

Similarly, as depicted in (B) of FIG. 13, there is also the same problem with I_PCM CUs successive in encoding order in an incomplete CTU on the right boundary of the image. In (B) of FIG. 13, "Infer" indicates that the value is determined by the decoder without transmitting cu_split_flag based on the position (x0 and y0) and block size (log2CbSize) of a CU to be processed, the size of the image frame (the width pic_width_in_luma_samples and the height pic_height_in_luma_samples), and the minimum CU size (Log2MinCbSizeY) (see the section 7.3.9.5 Coding unit syntax and the section 7.4.9.4 Coding quadtree semantics in NPL 1 for details). Further, in (B) of FIG. 13, "N" indicates that no CU exists in the position concerned and hence redundant cu_split_flag is not transmitted.

The CTU bitstream depicted in (B) of FIG. 13 is made up of: cu_split_flag=0, skip_flag=0, pred_mode_flag=1, part_mode=2N×2N, pcm_flag=1, pcm_alignment_zero_bit, and pcm_sample_luma/pcm_sample_chroma of CU(0); cu_split_flag=0, skip_flag=0, pred_mode_flag=1, part_mode=2N×2N, pcm_flag=1, pcm_alignment_zero_bit, and pcm_sample_luma/pcm_sample_chroma of CU(1); cu_split_flag=0, skip_flag=0, pred_mode_flag=1, part_mode=2N×2N, pcm_flag=1, pcm_alignment_zero_bit, and pcm_sample_luma/pcm_sample_chroma of CU(2); cu_split_flag=0, skip_flag=0, pred_mode_flag=1, part_mode=2N×2N, pcm_flag=1, pcm_alignment_zero_bit, and pcm_sample_luma/pcm_sample_chroma of CU(3); cu_split_flag=0, skip_flag=0, pred_mode_flag=1, part_mode=2N×2N, pcm_flag=1, pcm_alignment_zero_bit, and pcm_sample_luma/pcm_sample_chroma of CU(4); and cu_split_flag=0, skip_flag=0, pred_mode_flag=1, part_mode=2N×2N, pcm_flag=1, pcm_alignment_zero_bit, and pcm_sample_luma/pcm_sample_chroma of CU(5).

It is an object of the present invention to provide a video encoding device, a video decoding device, a video encoding method, a video decoding method, a video encoding program, and a video decoding program capable of transmitting PCM data on I_PCM CUs efficiently even when the I_PCM CUs are generated successively in encoding order in a CTU.

Solution to Problem

A video encoding device according to the present invention includes: transform means for transforming an image block; entropy encoding means for entropy-encoding transformed data on the image block transformed by the transform means; PCM encoding means for PCM-encoding the image block; multiplexed data selection means for selecting, for each image block, either output data of the entropy encoding means or output data of the PCM encoding means; and multiplexing means for multiplexing ctu_pcm_flag syntax indicating whether all image blocks belonging to a coding tree unit as a set of image blocks selected by the multiplexed data selection means are PCM blocks, at the top of the coding tree unit, wherein when all image blocks belonging to the coding tree unit are PCM blocks, the multiplexing means does not multiplex at least cu_split_flag syntax indicative of the splitting pattern of the coding tree unit.

A video decoding device according to the present invention includes: de-multiplexing means for de-multiplexing a bitstream including ctu_pcm_flag syntax indicating whether all image blocks belonging to a coding tree unit to be decoded are PCM blocks; PCM decoding means for PCM-decoding PCM data on an image block included in the bitstream; entropy decoding means for entropy-decoding transformed data on the image block included in the bitstream; and decoding control means which, when the value of ctu_pcm_flag syntax of the coding tree unit to be decoded is 1, determines cu_split_flag syntax indicative of the splitting pattern of the coding tree unit based on the position of the image block in the coding tree unit, the size of an image frame to be decoded, and the maximum PCM block size.

A video encoding method according to the present invention includes: transforming an image block; entropy-encoding transformed data on the transformed image block; PCM-encoding the image block; selecting, for each image block, either entropy-encoded data or PCM-encoded data; and multiplexing ctu_pcm_flag syntax indicating whether all image blocks belonging to a coding tree unit as a set of image blocks are PCM blocks, at the top of the coding tree unit, wherein when all image blocks belonging to the coding tree unit are PCM blocks, at least cu_split_flag syntax indicative of the splitting pattern of the coding tree unit is not multiplexed.

A video decoding method according to the present invention includes: de-multiplexing a bitstream including ctu_pcm_flag syntax indicating whether all image blocks belonging to a coding tree unit to be decoded are PCM blocks; PCM-decoding PCM data on an image block included in the bitstream; entropy-decoding transformed data on the image block included in the bitstream; and when the value of ctu_pcm_flag syntax of the coding tree unit to be decoded is 1, determining cu_split_flag syntax indicative of the splitting pattern of the coding tree unit based on the position of the image block in the coding tree unit, the size of an image frame to be decoded, and the maximum PCM block size.

A video encoding program according to the present invention causes a computer to execute: a process of transforming an image block; a process of entropy-encoding transformed data on the transformed image block; a process of PCM-encoding the image block; a process of selecting, for each image block, either entropy-encoded data or PCM-encoded data; and a process of multiplexing ctu_pcm_flag syntax indicating whether all image blocks belonging to a coding tree unit as a set of image blocks are PCM blocks, at the top of the coding tree unit, wherein when all image blocks belonging to the coding tree unit are PCM blocks, the computer is caused not to multiplex at least cu_split_flag syntax indicative of the splitting pattern of the coding tree unit.

A video decoding program according to the present invention causes a computer to execute: a process of de-multiplexing a bitstream including ctu_pcm_flag syntax indicating whether all image blocks belonging to a coding tree unit to be decoded are PCM blocks; a process of PCM-decoding PCM data on an image block included in the bitstream; a process of entropy-decoding transformed data on the image block included in the bitstream; and when the value of ctu_pcm_flag syntax of the coding tree unit to be decoded is 1, a process of determining cu_split_flag syntax indicative of the splitting pattern of the coding tree unit based on the position of the image block in the coding tree unit, the size of an image frame to be decoded, and the maximum PCM block size.

Advantageous Effects of Invention

According to the present invention, when all CUs in a CTU are I_PCM, these pieces of PCM data can be transmitted efficiently.

BRIEF DESCRIPTION OF DRAWINGS

FIG. 2 It depicts an explanatory diagram of encoding I_PCM CUs.

FIG. 5 It depicts a flowchart depicting the operation of the video decoding device of the second exemplary embodiment.

FIG. 6 It depicts an explanatory diagram of a list representing coding tree unit syntax.

FIG. 7 It depicts an explanatory diagram of a list representing PCM quadtree syntax.

FIG. 8 It depicts an explanatory diagram of a list representing PCM sample syntax.

FIG. 13 It depicts an explanatory diagram of encoding I_PCM CUs.

DESCRIPTION OF EMBODIMENTS

Exemplary Embodiment 1

Figure 1:
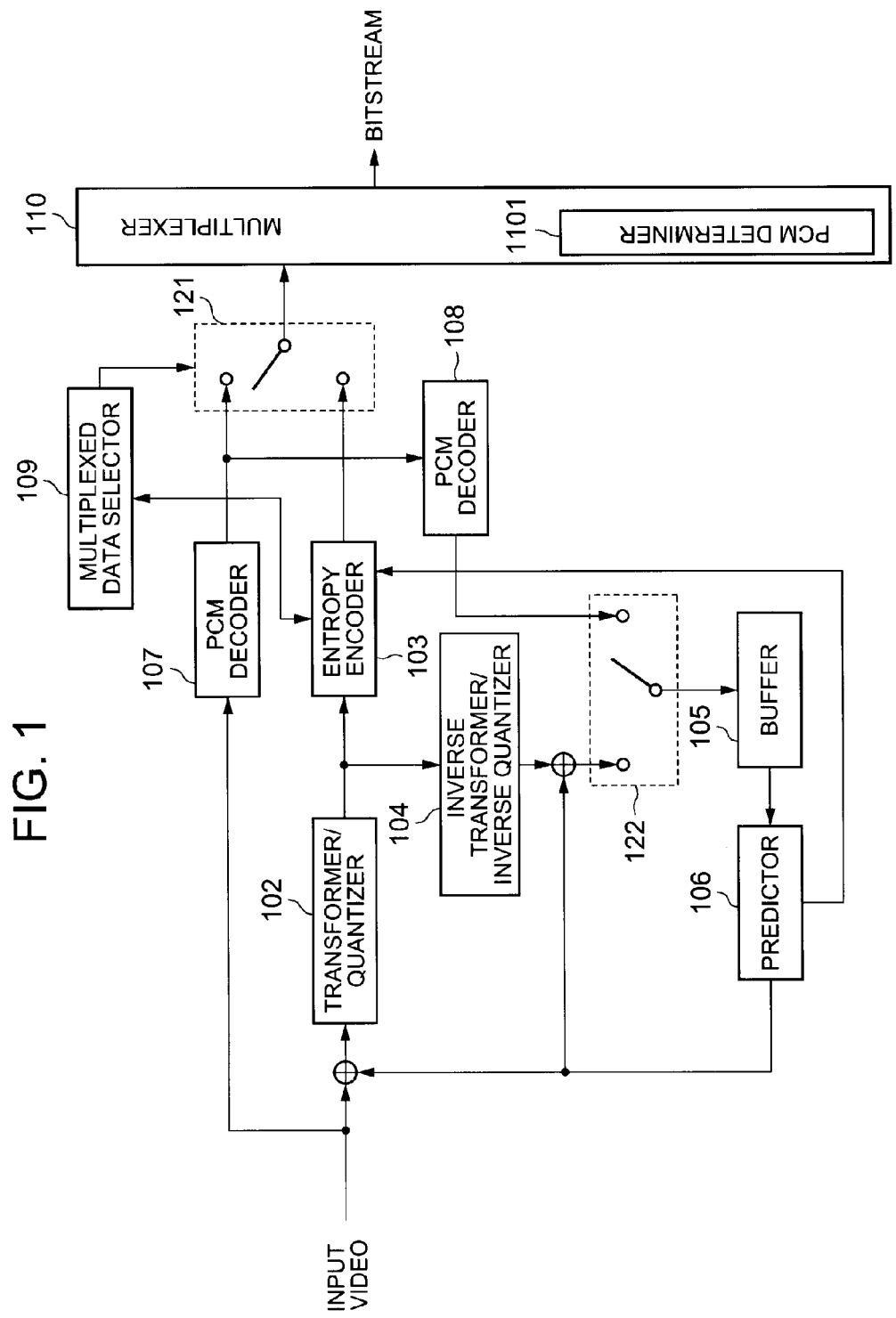
FIG. 1 It depicts a block diagram depicting a video encoding device of a first exemplary embodiment.
Figure 11:
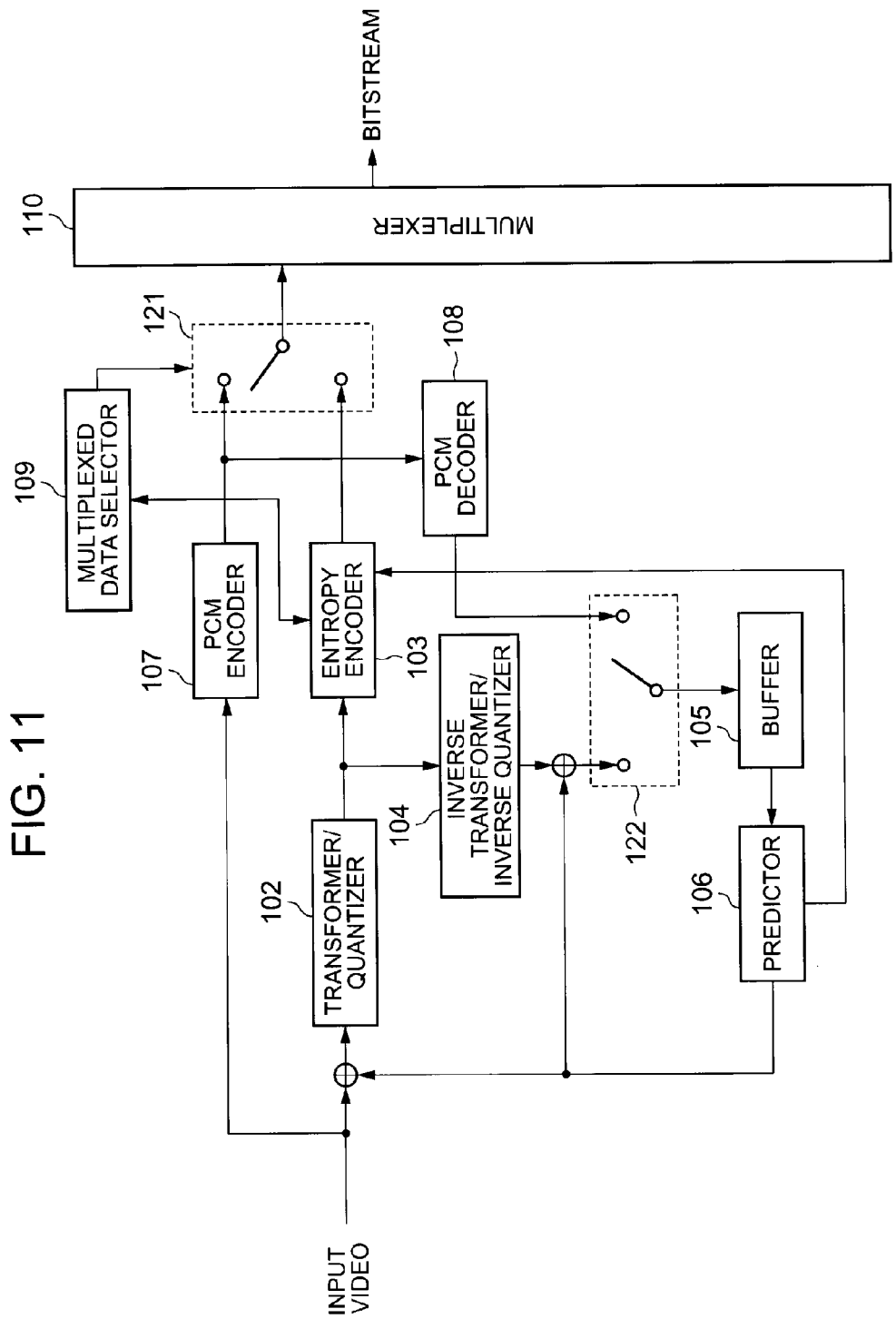
FIG. 11 It depicts a block diagram depicting a typical video encoding device.
Figure 12:
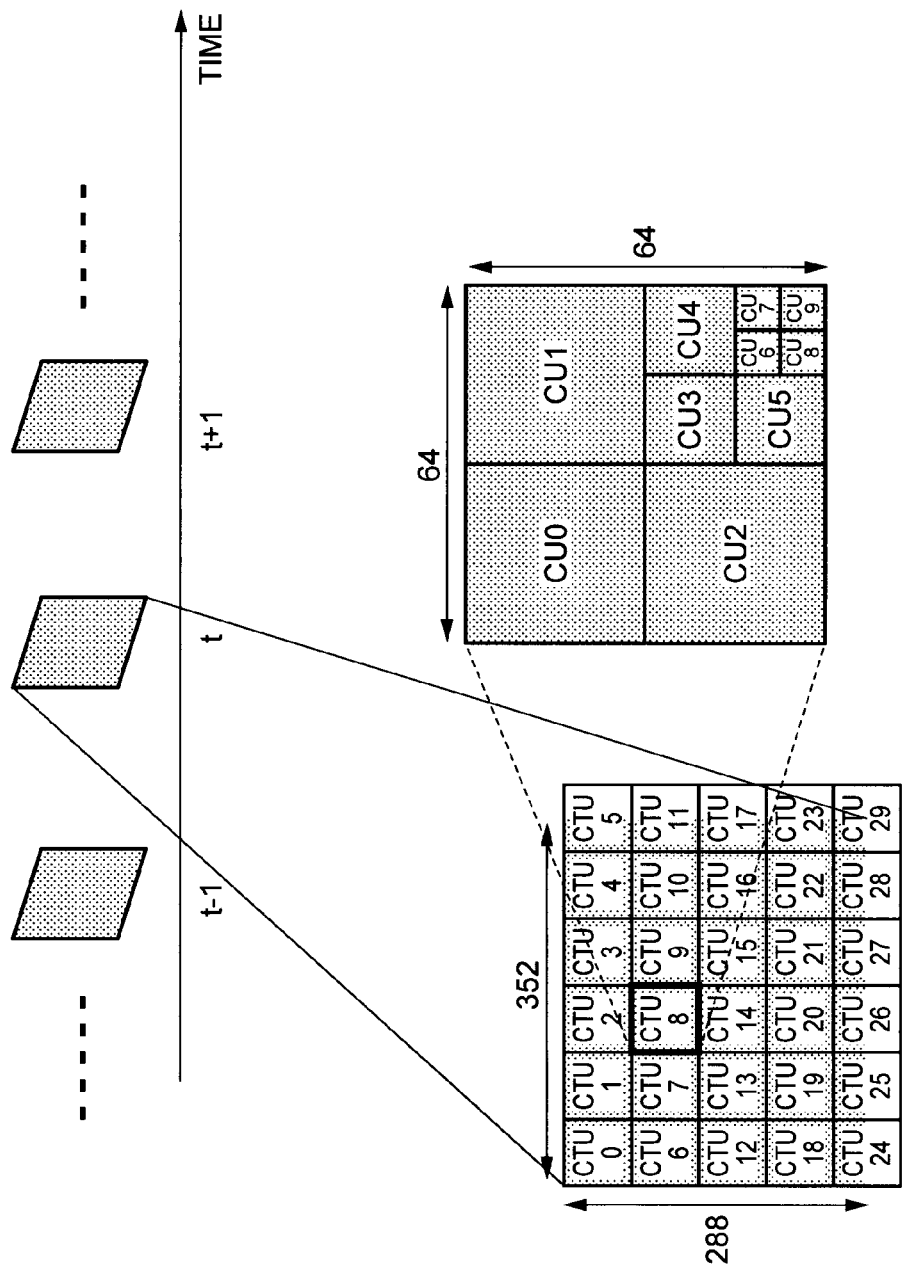
FIG. 12 It depicts an explanatory diagram depicting an example of CTU splitting of a frame t, and an example of CU splitting of CTU8 in the frame t.

FIG. 1 is a block diagram depicting a video encoding device of a first exemplary embodiment. The video encoding device of the exemplary embodiment includes a multiplexer 1100 instead of the multiplexer 110 in the video encoding device depicted in FIG. 11. Unlike the multiplexer 110 depicted in FIG. 11, the multiplexer 1100 in the exemplary embodiment includes an PCM determiner 1101 which determines whether all CUs in a CTU to be encoded are I_PCM. An example where the PCM determiner 1101 is present in the multiplexer 1100 is depicted in FIG. 1, but it is not indispensable. The PCM determiner 1101 may be provided in a part other than the multiplexer 1100, or may be provided independently of each unit depicted in FIG. 1.

It is assumed that the video encoding device of the exemplary embodiment transmits I_PCM CUs successive in transmission order in each CTU. In the exemplary embodiment, it is also assumed as depicted in (A) of FIG. 2 (like in (A) of FIG. 13 that CU(0), CU(1), CU(2), and CU(3) successive in encoding order are blocks to be PCM-encoded.

The operation of the video encoding device will be described with reference to a flowchart of FIG. 3 by taking I_PCM CUs depicted in (A) of FIG. 2 as an example.

Figure 3:
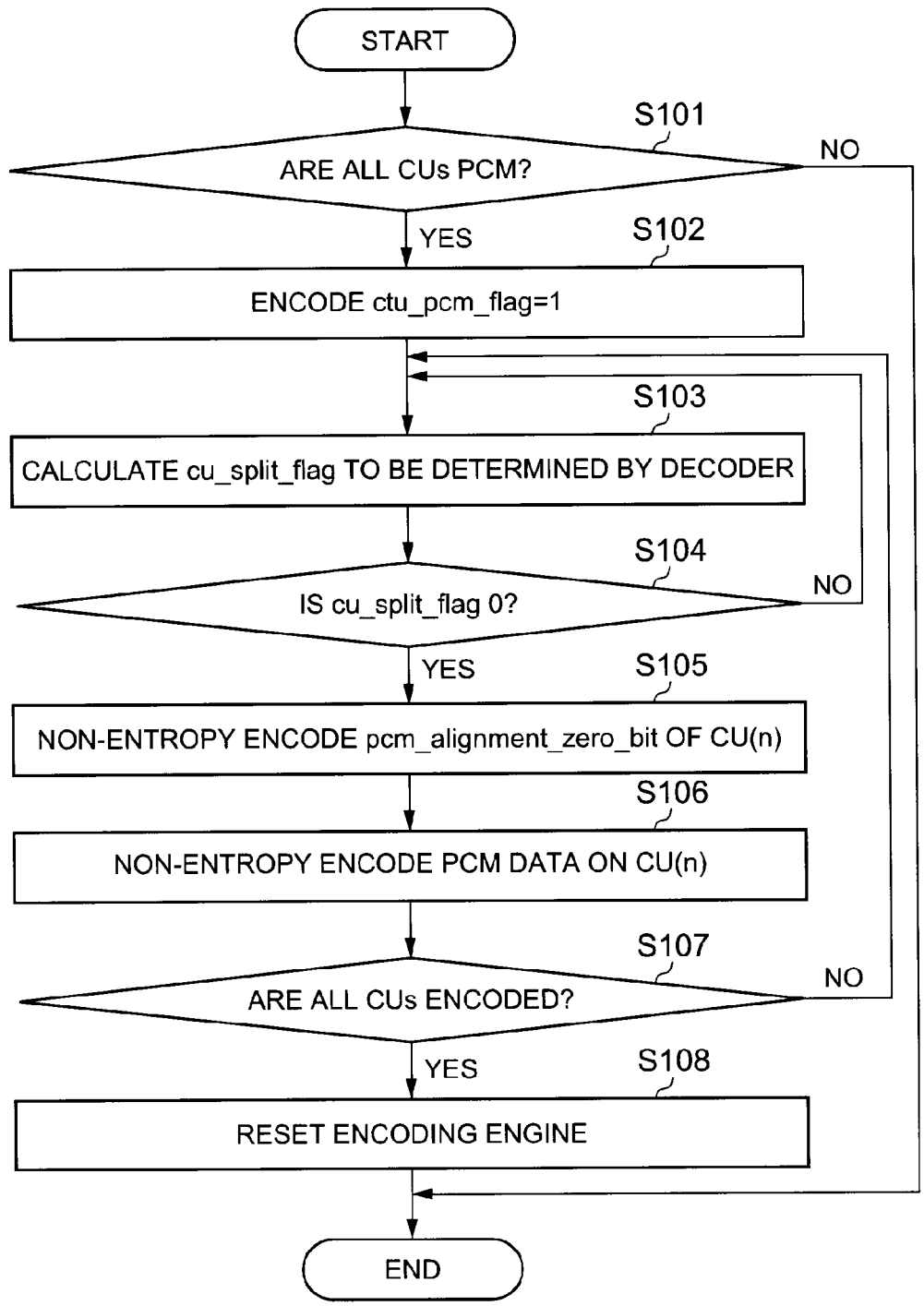
FIG. 3 It depicts a flowchart depicting the operation of the video encoding device of the first exemplary embodiment.

The video encoding device of the exemplary embodiment operates as depicted in the flowchart of FIG. 3. In other words, the PCM determiner 1101 determines in step S101 whether all CUs in a CTU to be encoded are I_PCM. When all the CUs are I_PCM, ctu_pcm_flag syntax is set to 1. Otherwise, ctu_pcm_flag syntax is set to 0. When the example depicted in (A) of FIG. 2 is used, the value of ctu_pcm_flag becomes 1. In this case, the entropy encoder 103 entropy-encodes ctu_pcm_flag=1 in step S102. The entropy encoder 103 further outputs symbols that have not been output yet. When the value of ctu_pcm_flag is 0, although the processing is completed in the flowchart of FIG. 3, the video encoding device of the exemplary embodiment encodes each CU in the same manner as the typical video encoding device after the entropy encoder 103 entropy-encodes ctu_pcm_flag=0.

Based on the position (x0, y0) and size (log2CbSize) of a CU to be processed, the size (the width pic_width_in_luma_samples and the height pic_height_in_luma_samples) of an image frame, and the maximum size (Log2MaxIpcmCbSizeY, where Log2MaxIpcmCbSizeY is larger than or equal to the minimum CU size Log2MinCbSizeY) of the I_PCM CU, the multiplexer 1100 calculates in step S103 cu_split_flag of the CU determined by the decoder to be processed. When any one or more of the following conditions are met, the multiplexer 1100 sets cu_split_flag=1. In other words, the CU to be processed is split.

[Conditions]

$x0+(1<<\log2CbSize)>pic\_width\_in\_luma\_samples$     1.

$y0+(1<<\log2CbSize)>pic\_height\_in\_luma\_samples$     2.

$\log2CbSize>Log2MaxIpcmCbSizeY$     3.

When none of the above conditions is met, the multiplexer 1100 sets cu_split_flag=0. In other words, the CU to be processed is not split.

The multiplexer 1100 determines in step S104 whether cu_split_flag=0. When cu_split_flag=0, the procedure proceeds to step S105. Otherwise, the CU is split and the procedure returns to step S103.

In step S105, the multiplexer 1100 non-entropy encodes pcm_alignment_zero_bit of CU(n).

In step S106, the PCM encoder 107 non-entropy encodes PCM data on CU(n).

In step S107, the multiplexer 1100 determines whether all CUs in a CTU to be encoded are encoded. When all the CUs in the CTU to be encoded are encoded, the procedure proceeds to step S108. Otherwise, the procedure returns to step S103 to encode CUs to be processed next.

In step S108, the entropy encoder 103 resets the encoding engine. Then, the procedure proceeds to the process of encoding the next CTU.

The multiplexer 1100 outputs a bitstream obtained by multiplexing data encoded by the PCM encoder 107 and the entropy encoder 103.

The operation of the video encoding device of the exemplary embodiment is as described above. Note that, although the multiplexer 1100 multiplexes ctu_pcm_flag syntax, which indicates whether all image blocks belonging to a coding tree unit corresponding to a set of image blocks selected by the multiplexed data selector 109 are PCM blocks, at the top of the coding tree unit, the multiplexer 1100 does not multiplex at least cu_split_flag syntax indicative of the splitting pattern of the coding tree unit when all the image blocks belonging to the coding tree unit are PCM blocks.

According to the above-described operation of the video encoding device of the exemplary embodiment, when all CUs in a CTU to be encoded are I_PCM, an I_PCM mode header to be entropy-encoded is not inserted between PCM data on successive I_PCM CUs. In other words, the CTU bitstream illustrated in (A) of FIG. 2 is made up of: ctu_pcm_flag=1; pcm_alignment_zero_bit and pcm_sample_luma/pcm_sample_chroma of CU(0); pcm_sample_luma/pcm_sample_chroma of CU(1); pcm_sample_luma/pcm_sample_chroma of CU(2), and pcm_sample_luma/pcm_sample_chroma of CU(3). The number of bits of one piece of PCM data is inevitably a multiple of 8 bits. Therefore, after an I_PCM CU is first transmitted, the start position of the subsequent I_PCM CU inevitably becomes a multiple of 8 bits. In other words, the start position of the subsequent I_PCM CU inevitably becomes a byte-aligned address. Therefore, pcm_alignment_zero_bit is not transmitted in CU(1), CU(2), and CU(3).

Similarly, the CTU bitstream depicted in (B) of FIG. 2 is made up of: ctu_pcm_flag=1; pcm_alignment_zero_bit and pcm_sample_luma/pcm_sample_chroma of CU(0); pcm_sample_luma/pcm_sample_chroma of CU(1); pcm_sample_luma/pcm_sample_chroma of CU(2); pcm_sample_luma/pcm_sample_chroma of CU(3); pcm_sample_luma/pcm_sample_chroma of CU(4); and pcm_sample_luma/pcm_sample_chroma of CU(5). In other words, when all CUs in a CTU to be encoded are I_PCM, the I_PCM mode header to be entropy-encoded is not inserted between PCM data on successive I_PCM CUs.

Therefore, when PCM data on the I_PCM CU subsequent to the first I_PCM CU is multiplexed into a bitstream, there is no need to wait until the completion of the process of outputting non-output symbols of the encoding engine and the process of resetting the encoding engine mentioned above. Therefore, the video encoding device of the exemplary embodiment can multiplex PCM data on successive I_PCM CUs into a bitstream efficiently. In other words, the PCM data on the successive I_PCM CUs can be transmitted efficiently.

Exemplary Embodiment 2

Figure 4:
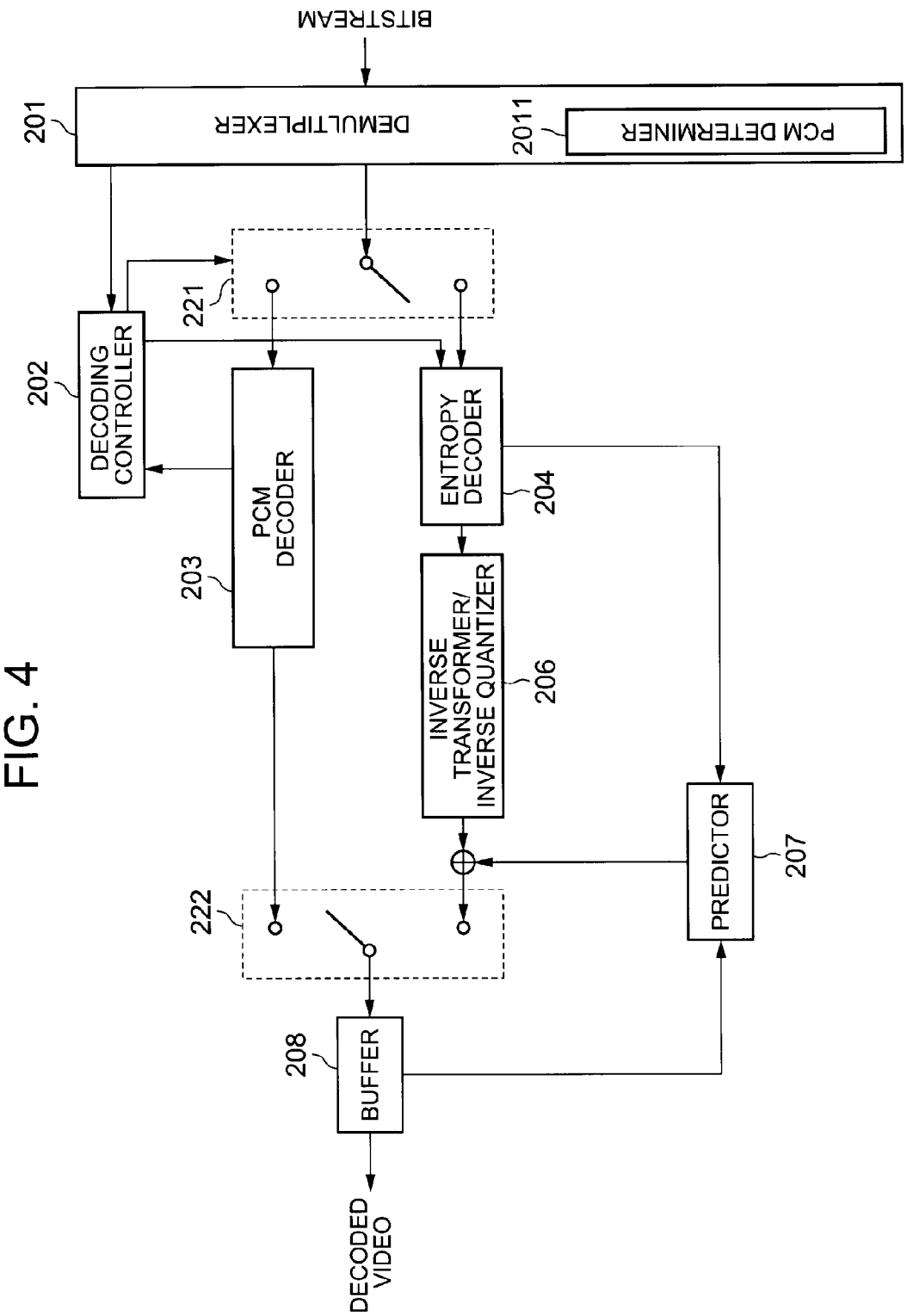
FIG. 4 It depicts a block diagram depicting a video decoding device of a second exemplary embodiment.

FIG. 4 is a block diagram depicting a video decoding device corresponding to the video encoding device of the first exemplary embodiment. The video decoding device of the exemplary embodiment includes a de-multiplexer 201, a decoding controller 202, a PCM decoder 203, an entropy decoder 204, an inverse transformer/inverse quantizer 206, a predictor 207, a buffer 208, and a switch 221 and a switch 222.

The de-multiplexer 201 includes an PCM determiner 2011 which determines whether all CUs in a CTU to be decoded are I_PCM. An example where the PCM determiner 2011 is present in the de-multiplexer 201 is depicted in FIG. 4, but it is not indispensable. The PCM determiner 2011 may be provided in a part other than the de-multiplexer 201, or may be provided independently of each unit depicted in FIG. 4.

The de-multiplexer 201 de-multiplexes an input bitstream and extracts a video bitstream.

When ctu_pcm_flag obtained by entropy-decoding the video bitstream of a CTU to be decoded is 1 (i.e., when the PCM determiner 2011 determines that all CUs in the CTU to be decoded are I_PCM), the decoding controller 202 calculates cu_split_flag of a CU to be processed in the CTU to be decoded. Specifically, based on the position (x0, y0) and size (log2CbSize) of the CU to be processed, the size (the width pic_width_in_luma_samples and the height pic_height_in_luma_samples) of an image frame, and the maximum size (Log2MaxIpcmCbSizeY, where Log2MaxIpcmCbSizeY is larger than or equal to the minimum CU size Log2MinCbSizeY) of the I_PCM CU, when any one or more of the following conditions are met, cu_split_flag=1 is set. In other words, the CU to be processed is split.

[Conditions]

$x0+(1<<\log2CbSize)>pic\_width\_in\_luma\_samples$  1.

$y0+(1<<\log2CbSize)>pic\_height\_in\_luma\_samples$  2.

$\log2CbSize>Log2MaxIpcmCbSizeY$  3.

When none of the above conditions is met, the decoding controller 202 sets cu_split_flag=0. In other words, the CU to be processed is not split.

Further, when cu_split_flag=0, the decoding controller 202 reads, from the video bitstream, pcm_alignment_zero_bit syntax of an I_PCM CU to be decoded, and supplies the subsequent PCM data to the PCM decoder 203 without causing the entropy decoder 204 to entropy-decode the CU/PU header of a CU to be currently decoded. The PCM decoder 203 reads the PCM data supplied through the switch 221 and PCM decodes the PCM data. The decoding controller 202 changes over the switch 222 to supply a reconstructed image supplied from the PCM decoder 203 to the buffer 208. In the case of cu_split_flag=1, the decoding controller 202 proceeds to the process of decoding the next CU to be processed in the CTU to be decoded.

When ctu_pcm_flag obtained by entropy-decoding the video bitstream of the CTU to be decoded is 0, the decoding controller 202 causes the entropy decoder 204 to entropy-decode the CU/PU header of a CU to be currently decoded. When the entropy decoder 204 entropy-decodes pcm_flag having the value of 1, the decoding controller 202 reads, from the video bitstream, pcm_alignment_zero_bit syntax of the I_PCM CU to be decoded, and supplies the subsequent PCM data to the PCM decoder 203. The PCM decoder 203 reads the PCM data supplied through the switch 221 and PCM-decodes the PCM data. The decoding controller 202 changes over the switch 222 to supply a reconstructed image supplied from the PCM decoder 203 to the buffer 208. When the entropy decoder 204 entropy-decodes pcm_flag having the value of 0 or when there exists no pcm_flag, the entropy decoder 204 further entropy-decodes the prediction parameter and the quantization level value of a CU to be decoded, and supplies them to the inverse transformer/inverse quantizer 206 and the predictor 207.

The inverse transformer/inverse quantizer 206 inverse-frequency-quantizes the quantization level value, and further inverse-frequency-transforms the frequency transform coefficient obtained by the inverse quantization.

After the inverse transform, the predictor 207 generates a prediction signal using the image of a reconstructed picture stored in the buffer 208 based on the entropy-decoded prediction parameter. After the prediction signal is generated, the prediction signal supplied from the predictor 207 is added to a reconstructed prediction error image inverse-frequency-transformed by the inverse transformer/inverse quantizer 206, and the reconstructed prediction error image is supplied to the switch 222. After the prediction signal is added, the decoding controller 202 changes over the switch 222 to supply the reconstructed prediction error image, to which the prediction signal is added, to the buffer 208 as a reconstructed image. Then, the procedure proceeds to the process of decoding the next CU.

The operation of the video decoding device of the exemplary embodiment will be described with reference to a flowchart of FIG. 5.

In step S201, the PCM determiner 2011 determines whether all CUs in a CTU to be decoded are I_PCM. When all the CUs in the CTU to be decoded are I_PCM, the procedure proceeds to step S202. Otherwise, although the processing is ended in the flowchart of FIG. 5, the video decoding device of the exemplary embodiment decodes each CU in the same manner as the typical video encoding device.

In step S202, the decoding controller 202 calculates cu_split_flag of CU(n) to be decoded.

In step S203, the decoding controller 202 determines whether calculated cu_split_flag is 0. When it is 0, the procedure proceeds to step S204. Otherwise (when cu_split_flag is 1), the CU to be decoded is split, and the procedure returns to step S202.

In step S204, the decoding controller 202 reads, from a video bitstream, pcm_alignment_zero_bit syntax of CU(n) of I_PCM to be decoded. Note that the PCM decoder 203 may also read pcm_alignment_zero_bit syntax to be non-entropy encoded.

In step S205, the decoding controller 202 reads, from the video bitstream, PCM data on CU(n) of I_PCM to be decoded. The PCM decoder 203 non-entropy decodes the PCM data on CU(n). Note that the PCM decoder 203 may also read the PCM data to be non-entropy decoded. Then, as mentioned above, a reconstructed image of CU(n) is determined based on the PCM data.

In step S206, the decoding controller 202 determines whether all the CUs in the CTU to be decoded are decoded. When all the CUs are decoded, the procedure proceeds to step S207. Otherwise, the procedure returns to step S202 to decode the next CU.

In step S207, the entropy decoder 204 resets a decoding engine, and then ends the decoding process of the CTU to be decoded.

The operation of the video decoding device of the exemplary embodiment is as described above.

According to the operation of the video decoding device of the exemplary embodiment described above, there is no need to wait for the completion of the process of resetting the decoding engine in order to read, from the bitstream, PCM data on an I_PCM CU subsequent to the first I_PCM CU. Therefore, the video decoding device of the exemplary embodiment can read PCM data on successive I_PCM CUs from the bitstream efficiently. In other words, the PCM data on the successive I_PCM CUs can be received efficiently.

The coding tree syntax, the PCM quadtree syntax, and the PCM sample syntax corresponding to each of the aforementioned exemplary embodiments are depicted in FIG. 6, FIG. 7, and FIG. 8, respectively. Referring to FIG. 6, FIG. 7, and FIG. 8, a state of transmitting ctu_pcm_flag syntax is found from FIG. 6. A state of determining cu_split_flag syntax, indicative of the splitting pattern of the coding tree unit, based on the position of an image block of the coding tree unit, the size of an image frame to be decoded, and the maximum PCM block size (Log2MaxIpcmCbSizeY) is found from FIG. 7. A state of encoding pcm_alignment_zero_bit and PCM data (pcm_sample_luma/pcm_sample_chroma) is found from FIG. 8. In other words, it is found that the process of resetting the decoding engine is not required to read PCM data on successive I_PCM CUs from a bitstream.

In each of the aforementioned exemplary embodiments, it is assumed that all CUs in a CTU are I_PCM, but the present invention can also be applied to a case where all CUs in a CTU are Skip. For example, the all-PCM determiner which determines whether all CUs in a CTU are I_PCM has only to be replaced by an all-Skip determiner which determines whether all CUs in a CTU are Skip so that, when all the CUs are Skip, ctu_skip syntax will be encoded/decoded like the ctu_pcm syntax. Further, merge_idx described in the section 7.3.9.6 Prediction unit syntax of NPL 1 has only to be encoded/decoded following the ctu_skip flag.

Each of the aforementioned exemplary embodiments can be configured in hardware, but it is also possible to implement the exemplary embodiment by a computer program.

Figure 9:
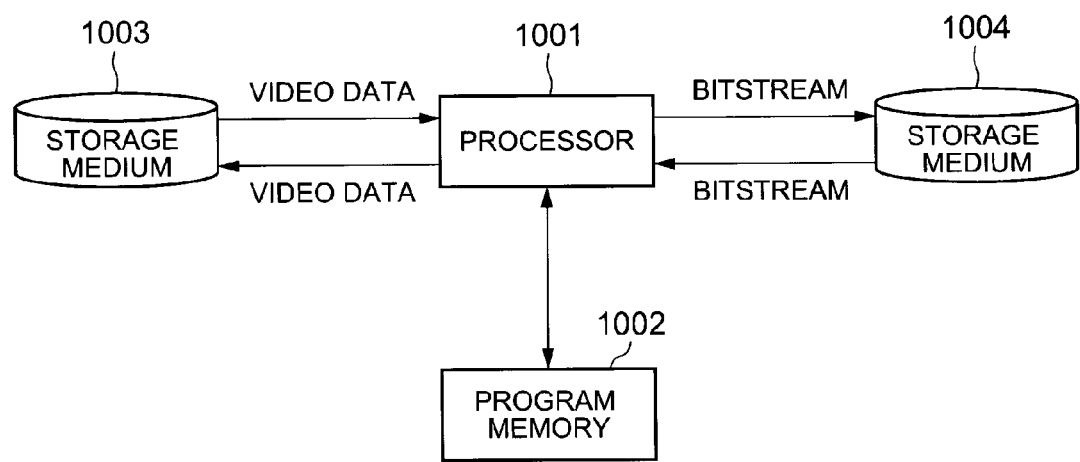
FIG. 9 It depicts a block diagram depicting an information processing system using a program.
Figure 10:
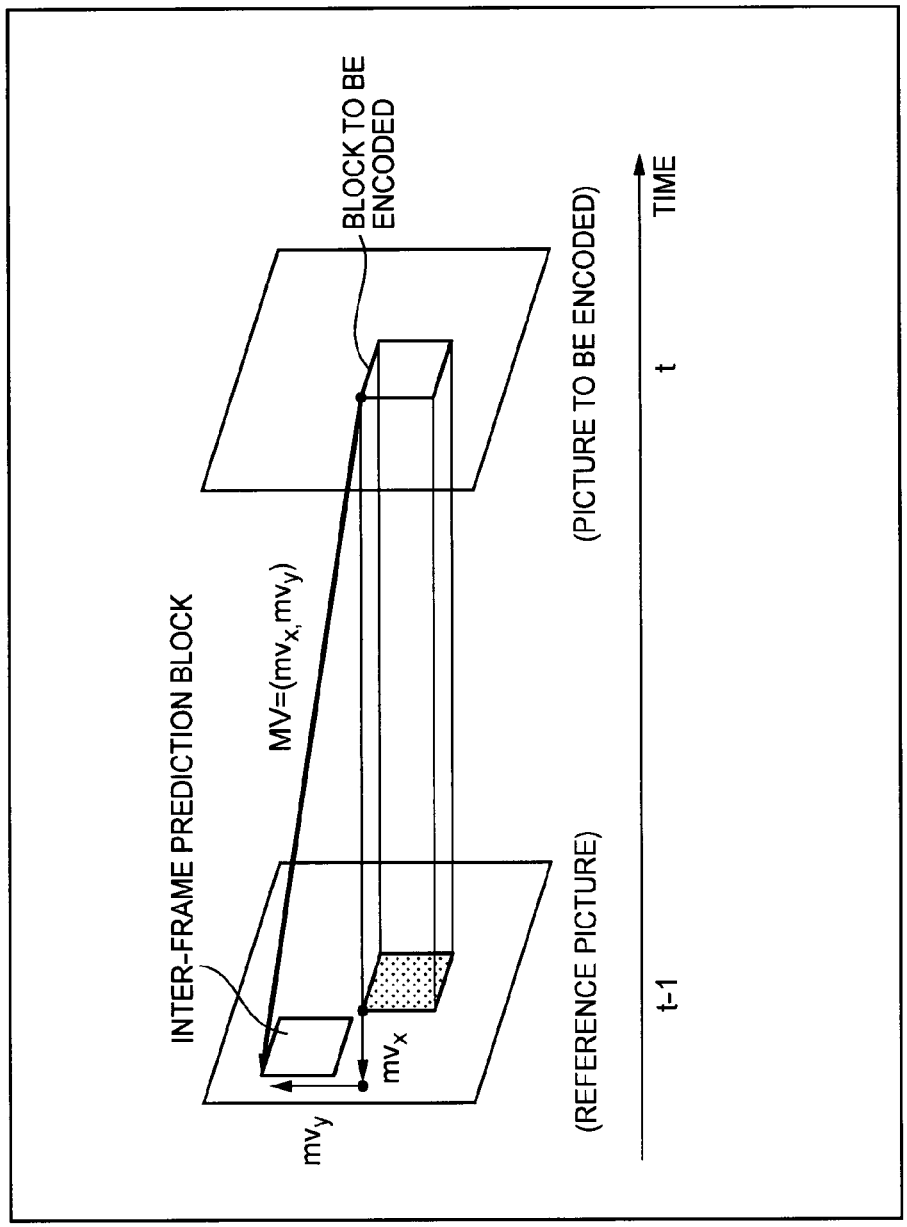
FIG. 10 It depicts an explanatory diagram depicting an example of inter-frame prediction.

An information processing system depicted in FIG. 9 includes a processor 1001, a program memory 1002, a storage medium 1003 for storing video data, and a storage medium 1004 for storing a bitstream. The storage medium 1003 and the storage medium 1004 may be separate storage media, or storage areas on the same storage medium. A magnetic storage medium such as a hard disk can be used as a storage medium.

In the information processing system depicted in FIG. 9, a program for realizing the function of each block depicted respectively in FIG. 1 and FIG. 4 is stored in the program memory 1002. Then, the processor 1001 executes processes according to the program stored in the program memory 1002 to realize the functions of the video encoding device or the video decoding device depicted in FIG. 1 or FIG. 4, respectively.

While the present invention has been described with reference to the aforementioned exemplary embodiments and examples, the present invention is not limited to the aforementioned exemplary embodiments and examples. Various changes that can be understood by those skilled in the art within the scope of the present invention can be made to the configurations and details of the present invention.

This application is based upon and claims the benefit of priority from Japanese patent application No. 2013-000290, filed on Jan. 7, 2013, the disclosure of which is incorporated herein in its entirety by reference.

REFERENCE SIGNS LIST 102 transformer/quantizer
103 entropy encoder
104 inverse transformer/inverse quantizer
105 buffer
106 predictor
107 PCM encoder
108 PCM decoder
109 multiplexed data selector
110, 1100 multiplexer
1101 PCM determiner
121 switch
122 switch
201 de-multiplexer
2011 PCM determiner
202 decoding controller
203 PCM decoder
204 entropy decoder
206 inverse transformer/inverse quantizer
207 predictor
208 buffer
221 switch
222 switch
1001 processor
1002 program memory
1003 storage medium
1004 storage medium

The invention claimed is:

1. A video decoding device comprising:
a memory storing instructions; and
one or more processors configured to execute the instructions to:
de-multiplex a bitstream including ctu_pcm_flag syntax indicating whether all image blocks belonging to a coding tree unit to be decoded are PCM blocks;
PCM-decode PCM data on an image block included in the bitstream;
entropy-decode transformed data on the image block included in the bitstream; and
when a value of ctu_pcm_flag syntax of the coding tree unit to be decoded is 1, determine cu_split_flag syntax indicative of a splitting pattern of the coding tree unit based on a position of the image block in the coding tree unit, a size of an image frame to be decoded, and a maximum PCM block size.

2. A video decoding method, implemented by a programmed processor, the method comprising:
de-multiplexing, by the programmed processor, a bitstream including ctu_pcm_flag syntax indicating whether all image blocks belonging to a coding tree unit to be decoded are PCM blocks;
PCM-decoding, by the programmed processor, PCM data on an image block included in the bitstream;
entropy-decoding, by the programmed processor, transformed data on the image block included in the bitstream; and
when a value of ctu_pcm_flag syntax of the coding tree unit to be decoded is 1, determining, by the programmed processor, cu_split_flag syntax indicative of a splitting pattern of the coding tree unit based on a position of the image block in the coding tree unit, a size of an image frame to be decoded, and a maximum PCM block size.

3. A non-transitory computer readable information recording medium storing a video decoding program which, when executed by a processor, causes the processor to perform a method comprising:
de-multiplexing a bitstream including ctu_pcm_flag syntax indicating whether all image blocks belonging to a coding tree unit to be decoded are PCM blocks;
PCM-decoding PCM data on an image block included in the bitstream;

entropy-decoding transformed data on the image block included in the bitstream; and when a value of ctu_pcm_flag syntax of the coding tree unit to be decoded is 1, determining cu_split_flag syntax indicative of a splitting pattern of the coding tree unit based on a position of the image block in the coding tree unit, a size of an image frame to be decoded, and a maximum PCM block size.

* * * * *